(12) United States Patent (10) Patent No.: US 12,662,180 B2
Zonzini et al. (45) Date of Patent: Jun. 23, 2026

(54) CONTROL METHOD FOR STAIR CLIMBER

(71) Applicants: Arianna Zonzini, Cerea (IT); Claudio Zonzini, Casaleone (IT); Laura Zonzini, Cerea (IT); Jacopo Zonzini, Casaleone (IT)

(72) Inventors: Arianna Zonzini, Cerea (IT); Claudio Zonzini, Casaleone (IT); Laura Zonzini, Cerea (IT); Jacopo Zonzini, Casaleone (IT)

( * ) Notice: Subject to any disclaimer, the term of this patent is extended or adjusted under 35 U.S.C. 154(b) by 416 days.

(21) Appl. No.: 18/406,291

(22) Filed: Jan. 8, 2024

(65) Prior Publication Data

US 2024/0239395 A1 Jul. 18, 2024

(51) Int. Cl.
B62B 5/00 (2006.01)
B62B 5/02 (2006.01)
(52) U.S. Cl.
CPC .......... B62B 5/0069 (2013.01); B62B 5/0033 (2013.01); B62B 5/02 (2013.01)
(58) Field of Classification Search
CPC .......... B62B 5/02; B62D 55/075; A61G 5/061
USPC .......................................... 180/8.2; 280/5.22
See application file for complete search history.

(56) References Cited

U.S. PATENT DOCUMENTS

| | | | | | |
|---|---|---|---|---|---|
| 4,915,184 A | * | 4/1990 | Watkins | ........... | B66B 9/08 |
| | | | | | 180/9.1 |
| 2006/0038360 A1 | * | 2/2006 | Negishi | ........... | B62D 55/075 |
| | | | | | 280/5.2 |

| | | | | | |
|---|---|---|---|---|---|
| 2008/0093131 A1 | * | 4/2008 | Couture | ........... | B25J 5/005 |
| | | | | | 180/9.1 |
| 2008/0183332 A1 | * | 7/2008 | Ohm | ........... | G05D 1/0246 |
| | | | | | 700/250 |
| 2011/0180334 A1 | * | 7/2011 | Rudakevych | ........ | B62D 55/075 |
| | | | | | 180/9.32 |

(Continued)

FOREIGN PATENT DOCUMENTS

| | | | | | |
|---|---|---|---|---|---|
| CN | 109649519 A | * | 4/2019 | .......... | B62D 55/075 |
| CN | 111494109 A | * | 8/2020 | .......... | A61G 5/1067 |

(Continued)

OTHER PUBLICATIONS

Italian Patent and Trademark Office, Search Report, Jul. 24, 2023— Relevant portions are in English.

*Primary Examiner* — John Olszewski
*Assistant Examiner* — Matthew D Lee
(74) *Attorney, Agent, or Firm* — Themis Law

(57) ABSTRACT

A control method for a stair climber having a support frame; a motorized mechanical group; a stabilizing element; a sensor detecting steps during the descent process; and a processing and control logic unit connected to the sensor, the stabilizing element, and the mechanical group. The control method includes a descent process, in which the logic unit commands the mechanical group to advance the climber until the sensor detects a first step; the logic unit stops the mechanical group interrupting the advancement of the climber; the logic unit commands the extraction of the stabilizing element to arrange it in an operating configuration; the logic unit commands the mechanical group so that the climber advances until the sensor detects a second step; the logic unit commands the retraction of the stabilizing element to arrange it in a rest configuration; and the logic unit commands the group so that the climber advances again.

10 Claims, 5 Drawing Sheets

(56) References Cited

U.S. PATENT DOCUMENTS

| | | | | | |
|---|---|---|---|---|---|
| 2014/0332291 A1 * | 11/2014 | Zonzini | .................... | B62B 3/02 |
| | | | | 180/9.42 |
| 2019/0350782 A1 * | 11/2019 | Wang | .................... | B62D 55/04 |
| 2023/0227089 A1 * | 7/2023 | Zonzini | ................ | B62B 5/0033 |
| | | | | 280/5.22 |
| 2024/0034117 A1 * | 2/2024 | Panigrahi | ................ | B60P 1/006 |

FOREIGN PATENT DOCUMENTS

| | | | | | | |
|---|---|---|---|---|---|---|
| CN | 113443030 A | * | 9/2021 | .......... | B62D 55/075 |
| CN | 214930185 U | * | 11/2021 | | |
| CN | 114684285 A | * | 7/2022 | .......... | B62D 55/075 |
| EP | 0345803 | | 12/1989 | | |
| FR | 2610885 | | 8/1988 | | |
| JP | 2014054948 A | * | 3/2014 | | |
| WO | 2021260547 | | 12/2021 | | |

* cited by examiner

102

103, 105

109

110

15

22

6

112

4

6

CONTROL METHOD FOR STAIR CLIMBER

FIELD OF THE INVENTION

The present invention relates to the technical field of transport and, in particular, to the transport of objects. More particularly, the present invention relates to a control method for a stair climber.

BACKGROUND OF THE INVENTION

In the field of the transport of objects, motorized stair climbers are known and are generally used to transport loads in the absence of lifts or elevators.

The increasing use of these devices has led to the recent need to improve their automation to ensure a more effective transport and to improve operator safety.

Document WO 2021/260547 A1 is known, which describes a self-propelled stair climber that comprises motorized tracks, a loading plane and a stabilization element.

That stair climber has a geometry that is particularly suitable for climbing and descending stairs, however, it is difficult to adapt to different types of ramps, where lifts and treads can vary depending on the building in which they are installed.

In fact, according to what is described in the aforementioned document, the descent phase is based on pre-established distance parameters and, therefore, is not adaptable to possible configurations that were not previously envisaged.

In addition thereto, the loading plane on which the goods to be transported rest is adjusted by tilting it with respect to the climber frame according to standard inclinations without considering, for example, that objects with different weights and centers of gravity need different inclinations for safer transport.

SUMMARY OF THE INVENTION

An aim of the present invention is to make available a control method for a stair climber that allows overcoming at least partially the above discussed drawbacks.

In particular, it is an aim of the present invention to make available a control method that allows improving the automation of the stair climbers compared to known equivalent devices.

In other words, an aim of the present invention is to make available a method for controlling the descent and ascent of a stair climber that allows advancing independently of the geometry of the stairs, i.e. by lift and tread.

Furthermore, another aim of the present invention is to make available a control method that allows optimizing the inclination of the loading plane as the transported goods vary, with the aim of a safer and more stable positioning of the load in relation to the track section in contact with the stair below.

The aforementioned aims, as well as others that will appear more clearly below, are achieved by a stair climber in accordance with the invention.

In particular, a stair climber according to the invention comprises at least one support frame, a motorized mechanical group for the movement, stably coupled to the support frame, and at least one stabilizing element also operatively coupled to the frame.

According to another aspect of the invention, the stair climber also comprises at least one first sensor also operatively coupled to the support frame and arranged so as to detect at least the presence of steps during descent and at least one processing and control logic unit operatively connected to the first sensor, to the stabilizing element and to the mechanical group.

The control method comprises a descent process that provides for at least a first descent phase, in which the processing and control logic unit commands the motorized mechanical group so that the stair climber advances until a first step is detected by the first sensor.

Subsequently, in a second descent phase, the logic unit stops the mechanical group interrupting the advancement of the stair climber and then, in a third phase, commands the extraction of the stabilizing element so as to arrange it according to an operating configuration, in which the weight of the climber is at least partially supported by it.

At this point, the descent process provides for a fourth descent phase, in which the processing and control logic unit commands the mechanical group so that the climber advances until the first sensor detects the presence of a second step.

Then, according to a fifth descent phase, the logic unit commands the retraction of the stabilizing element so as to arrange it according to a rest configuration, in which the weight of the stair climber is supported by the mechanical group.

Finally, in a sixth descent phase, the processing and control logic unit commands the motorized group so that the stair climber advances along the descent path.

Advantageously, therefore, by means of the first sensor it is possible to identify the presence of possible steps so as to start the descent process.

The descent is controlled by the logical unit allowing an automation of the process. In fact, the first sensor allows the detection of the first and second step, adjusting the advancement of the stair climber.

Furthermore, as a result of the detection of steps, the logic unit controls the stabilizing element allowing it to be arranged according to an operating configuration in a substantially automatic manner.

It can be seen that the descent process of the invention allows a stair climber to descend autonomously along a stair independently of its geometry.

BRIEF DESCRIPTION OF THE DRAWINGS

Additional characteristics and advantages of the invention will become more apparent in the light of the detailed description of some preferred, but not exclusive, embodiments of a control method according to the invention, illustrated by way of a non-limiting example with the aid of the accompanying drawing figures in which.

DETAILED DESCRIPTION OF EMBODIMENTS OF THE INVENTION

Figure 1:
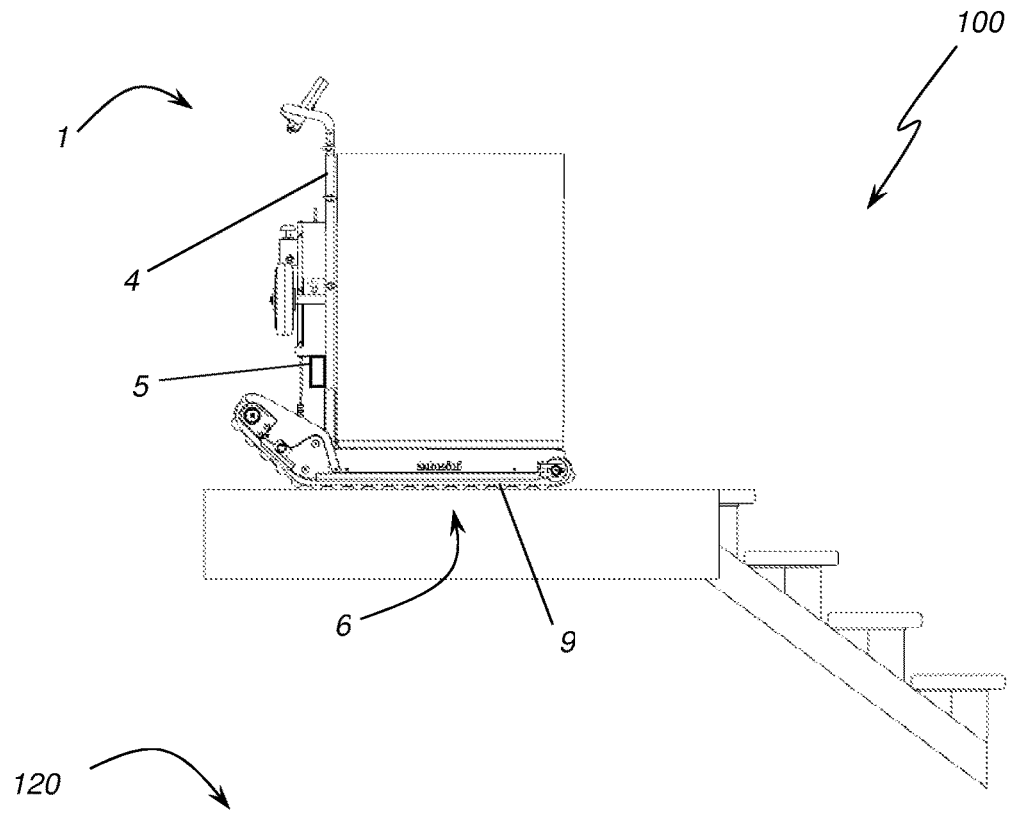
FIGS. 1 to 9 represent diagrammatically side views of the stair climber during the different steps of a control method according to the invention.
Figure 2:
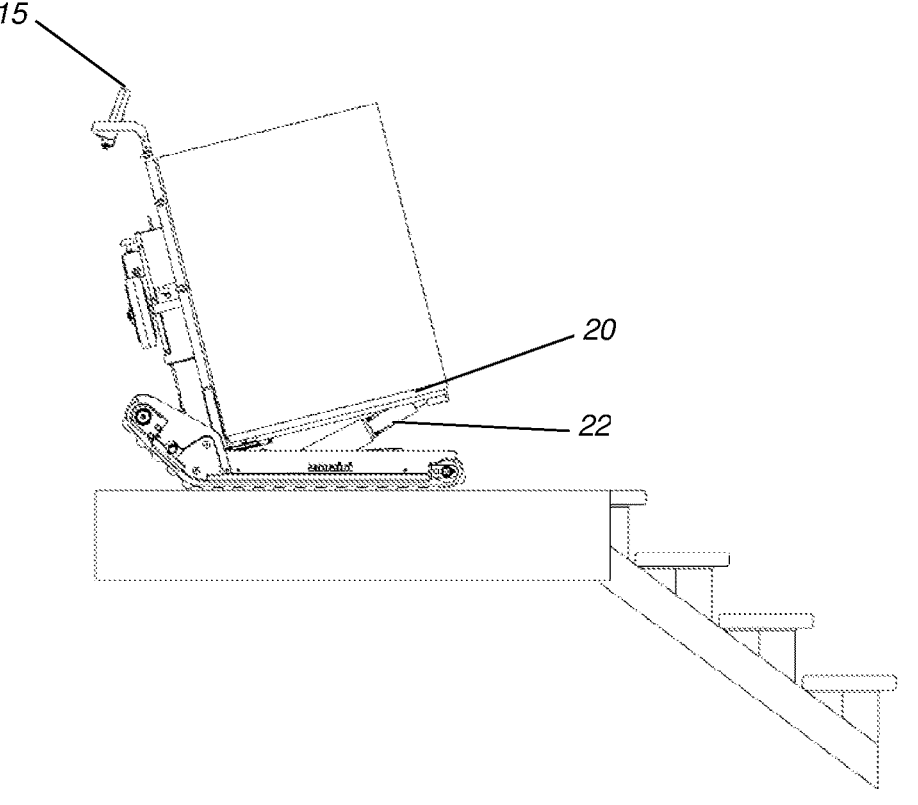
Figure 3:
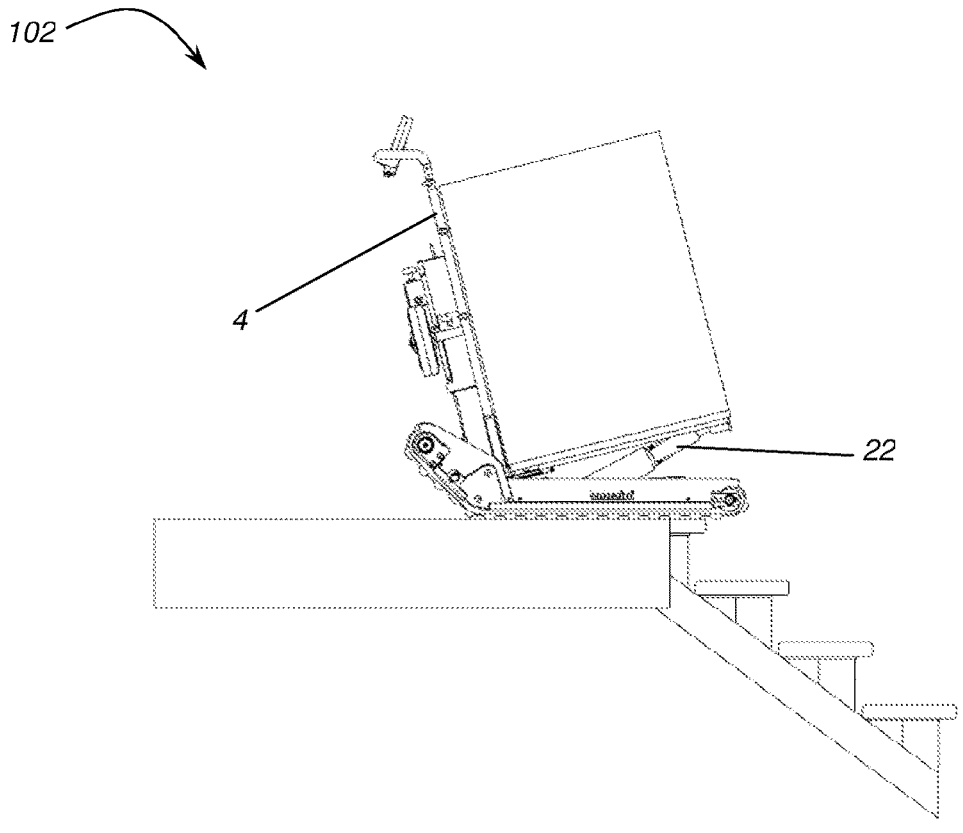
Figure 4:
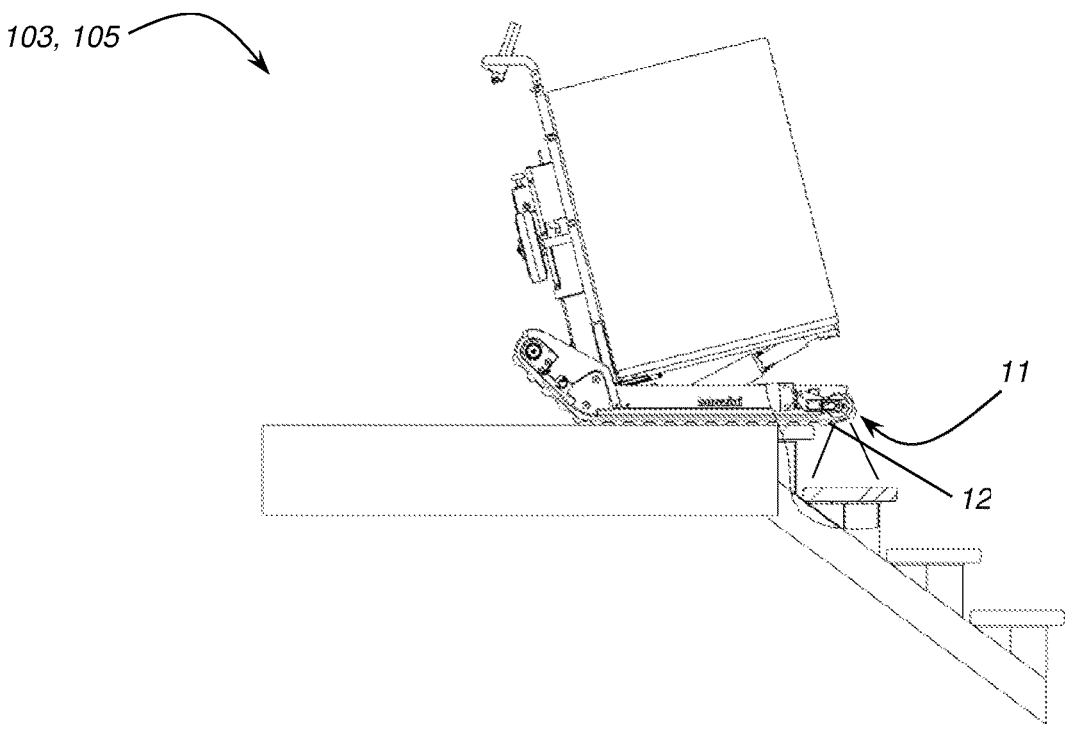
Figures 5, 6:
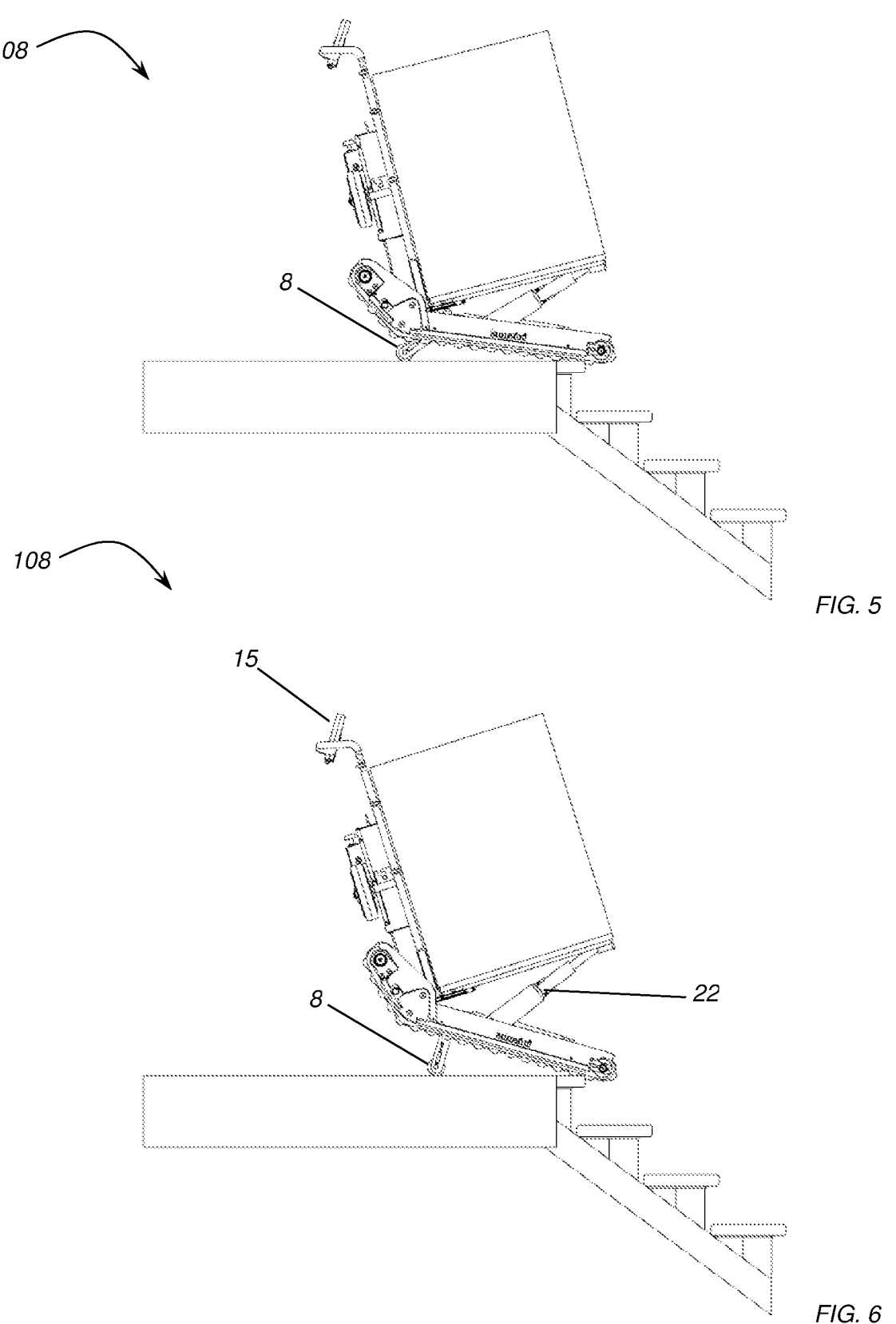
Figures 7, 8:
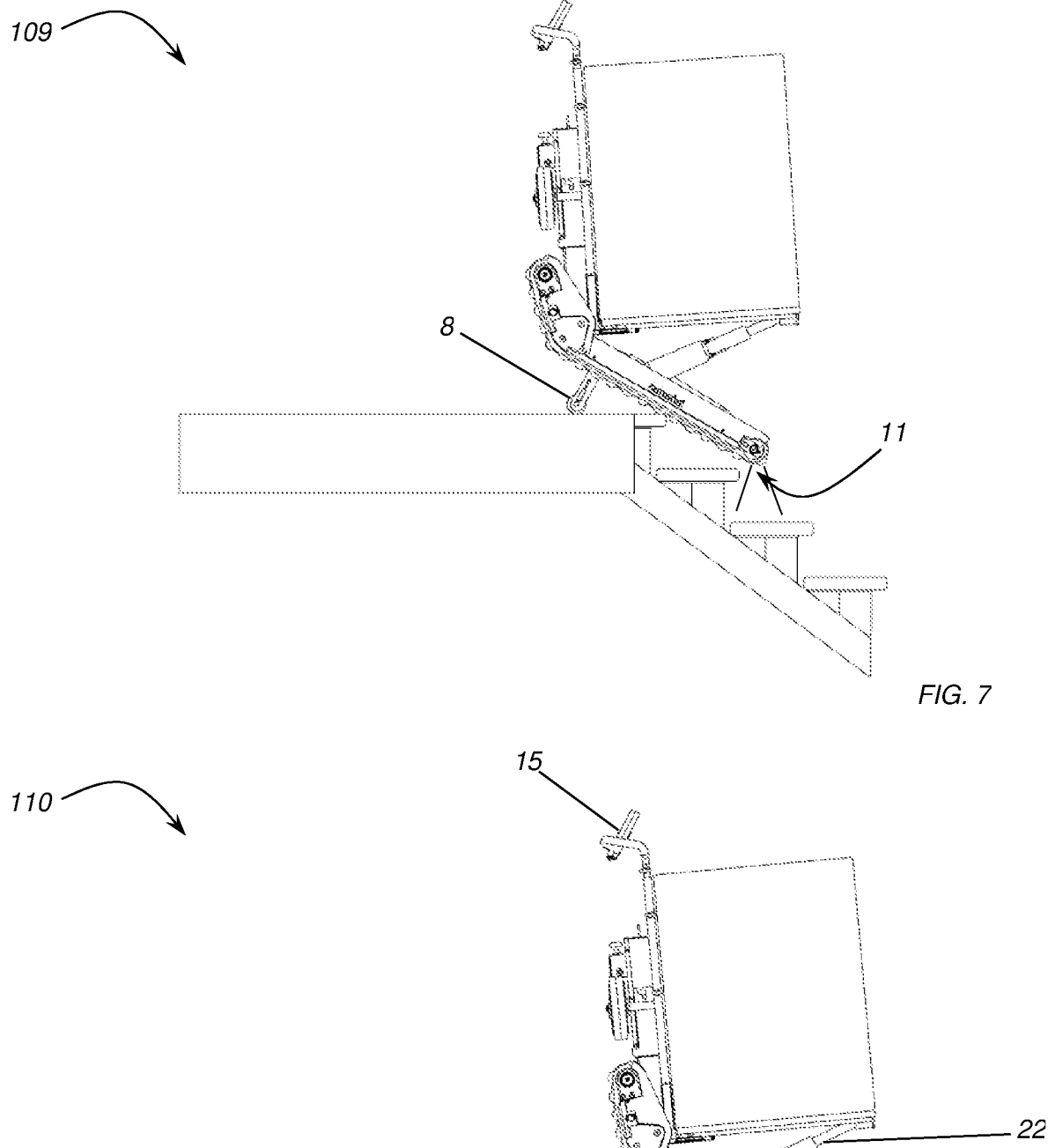
Figure 9:
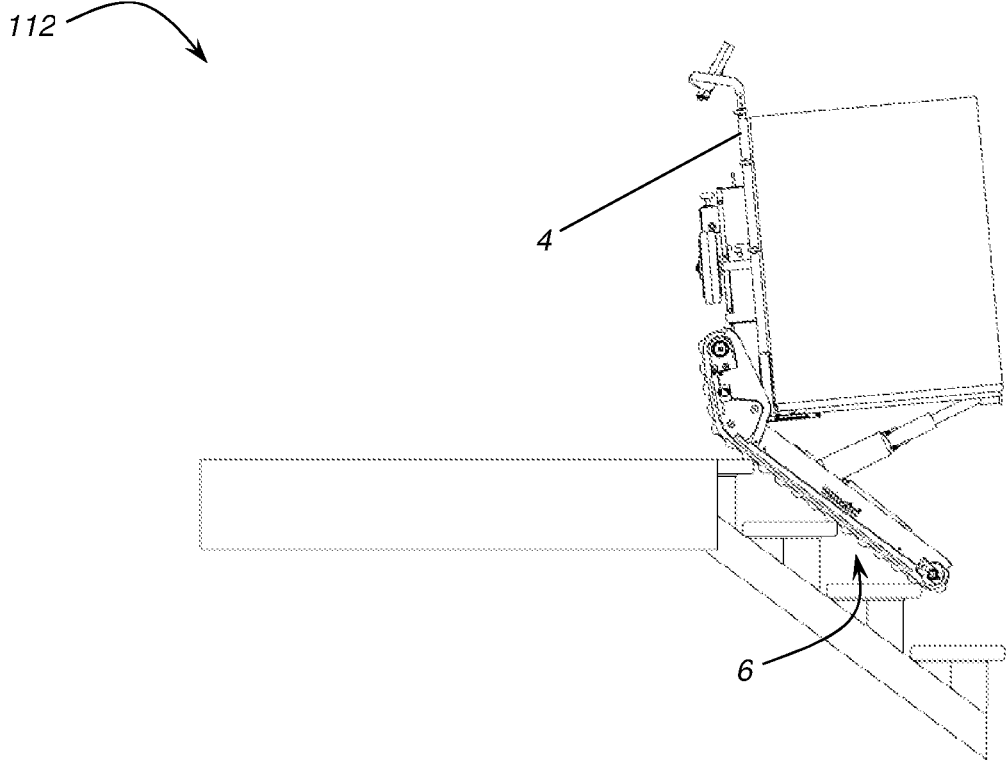

With reference to the figures, a control method 100 for a stair climber 1 comprising a descent process 102 is described. In particular, the stair climber 1 comprises a support frame 4, a motorized mechanical group 6 and a stabilizing element 8.

The motorized mechanical group 6 is conformed for the movement of the stair climber 1 and is stably coupled to the frame 4. Typically, but not necessarily, it comprises a series of tracks 9 powered by an electric battery, not depicted in the figures.

The nature of the motorized group and the power supply system should not be considered as limiting for different embodiment variants of the invention where, for example, they may comprise several wheels or an equivalent power supply.

As regards the stabilizing element 8, it is also operatively coupled to the support frame 4.

In particular, typically but not necessarily, the stabilizing element 8 is provided with rollers and with at least one proximity sensor to detect the contact between the floor and the stabilizing element 8. By means of this sensor, which is operatively connected with the processing and control logic unit 5, it is possible to control the contact of the stabilizing element 8 with the surface so as to improve the stability of the stair climber 1.

A complete description of the operation of the stabilizing element 8 is omitted here because within reach of a person skilled in the art in view, for example, of document WO 2021/260547 A1.

According to another aspect of the invention, the stair climber 1 also comprises a first sensor 11, typically but not necessarily comprising a proximity sensor 12, operatively coupled to the support frame 4 and arranged so as to detect the presence of steps during the execution of the aforementioned descent process 102.

The nature of the first sensor should also not be understood as limiting for different embodiment variants of the invention where, for example, it may be an optical, magnetic or ultrasonic sensor.

According to a further aspect of the invention, the stair climber 1 also comprises a processing and control logic unit 5, operatively connected with the first sensor 11, with the stabilizing element 8 and with the mechanical group 6.

Operationally, the descent process 102 of the stair climber 1 provides for a first descent phase 103, in which the logic unit 5 commands the mechanical group 6 so that the stair climber 1 advances until the first sensor 11 detects the presence of a first step.

As a result of the detection of the first step, in a second descent phase 105, the logic unit 5 stops the mechanical group 6, interrupting the advancement of the stair climber 1.

In one embodiment, the second phase 105 is followed by a descent start phase 106, in which the processing and control logic unit 5 sends a signal of the occurred detection of the first step to a user interface 15 operatively connected with the logic unit 5 itself.

The nature of the signal should also not be considered as limiting for different embodiment variants of the invention where, for example, the signal may be a video message, an acoustic and/or a light signal.

Subsequently, an operator of the stair climber 1 accepts the reception of the first step detection message and, again by means of the user interface 15, the operator commands the logic unit 5 to proceed with the execution of the descent process 102.

Then, according to another aspect of the invention, the descent process 102 provides for a third descent phase 108, in which the processing and control logic unit 5 commands the extraction of the stabilizing element 8 so as to arrange it according to an operating configuration, in which it partially supports the weight of the stair climber 1.

Then, in a fourth descent phase 109, the logic unit commands the mechanical group 6 so that the stair climber 1 advances, descending until the first sensor 11 detects the presence of a second step.

In other words, following the detection of the first step, the logic unit 5 mobilizes the stabilizing element 8 so as to support the weight of the climber 1 during the initial phases of the descent and at the same time to tilt the climber 1 in order to direct its advancement according to the detected slope.

Subsequently, in a fifth descent phase 110, the logic unit 5 commands the retraction of the stabilizing element 8 so as to arrange it according to a rest configuration in which the weight of the stair climber 1 is supported entirely by the mechanical group 6.

Finally, in a sixth descent phase 112 the logic unit 5 commands the mechanical group 6 to proceed along the descent path/stair.

Advantageously, therefore, the descent process 102 of the invention is substantially automated in that the movement of the stair climber 1 is controlled by the processing and control logic unit 5.

In fact, by means of the first sensor 11, it is possible to detect the presence and the arrangement of the steps, independently of their geometry, and consequently to control the advancement of the climber 1.

In addition, the control of the stabilizing element 8, i.e. of the element that enables the climber to be supported and tilted to align with the descent plane, is also carried out by means of the logic unit 5 in a substantially automated manner.

Therefore, a control method 100 according to the invention makes it possible to improve the control of the climber 1 during the descent operations, making these operations safer both for the transported products and for the operators who control the climber.

According to a further aspect of the invention, in the fourth descent phase 109 the logic unit 5 imposes a predetermined advancement speed limit on the mechanical group 6 of the stair climber 1.

Advantageously, the speed limit allows to safely perform an operation of approach to the staircase avoiding accidental accelerations that could lead to accidents.

According to another aspect of the invention, in the sixth descent phase 112 the processing and control logic unit 5 eliminates the previously imposed speed limit.

This enables an improvement of the transport of goods in an automated manner following the stabilization of the stair climber 1 on the ramp.

According to a further aspect of the invention, the control method 100 also comprises a load repositioning process 120.

In particular, the stair climber 1 also comprises a loading plane 20 that is movable and operatively coupled to the support frame 4. This plane 20 is conformed to receive a product/load to be transported restingly.

Furthermore, the stair climber 1 comprises an actuator 22 operatively connected to the processing and control logic unit 5 and operatively coupled to the loading plane 20 to move it.

According to another aspect of the invention, the climber 1 also comprises a second sensor, not depicted in the figures, operatively connected to the loading plane 20 and adapted to detect physical characteristics of the product arranged on the plane 20.

In particular, in the present embodiment, the second sensor is conformed to acquire information relating to the transported object such as to enable the processing and control logic unit 5 to determine the weight and/or the center of gravity of the object.

This aspect should also not be understood as limiting for different embodiment variants where, for example, the sensor detects and/or determines by means of the logical unit 5 other physical and/or geometric characteristics of the product adapted for the load repositioning process.

Furthermore, in the present embodiment of the invention, the second sensor comprises an accelerometer which enables the detection of the aforementioned information related to the physical characteristics of the product.

This aspect should also not be considered as limiting for different embodiment variants of the invention where, for example, the second sensor comprises other elements conformed to detect the variations in current of the actuator resulting from the positioning of the product on the loading plane.

As far as the load repositioning process 120 is concerned, it first of all envisages detecting the physical characteristics of the product by means of the second sensor.

Subsequently, the processing and control logic unit 5 analyzes these detected characteristics and then commands the actuator 22 to adjust the inclination of the loading plane 20 based on the detected product characteristics.

Therefore, the inclination of the loading plane 20 is not standard but is adapted on the characteristics of the goods that are typically transported, for example, but not necessarily, weight and center of gravity.

This allows, still advantageously, an improvement of the safety of the object during transport. In fact, independently of the shape and weight of the object, the loading plane 20 will assume an optimal position automatically.

Moreover, this repositioning process 120 can be performed several times during transport, by adjusting the inclination of the loading plane 20 depending on both the characteristics of the goods and the inclination of the floor distance being travelled.

In fact, as depicted in the figures, the repositioning process 120 is also performed during the descent process 102, where the logic unit adjusts the inclination of the loading plane 20 also based on the slope of the stairs that the climber 1 descends.

In addition thereto, the repositioning process 120 can also be carried out during an ascent process, which typically takes place by means of a third sensor, opposite to the first sensor, to identify the end of the stair and the arrival at a landing.

As is known from document WO 2021/260547 A1, it is possible to control the arrangement of the stabilizing element using a third sensor suitable for detecting the arrival at a landing and to automate the ascent.

In an embodiment variant, not depicted in the figures, the stair climber also comprises a memory unit, operatively connected to the logic unit 5, having a database comprising several predetermined inclinations based on the detected product characteristics.

In view of the foregoing, it can be seen that a control method according to the invention achieves all intended purposes.

In particular, a control method according to the invention enables an automation of the process of descent and a repositioning of the load in a stair climber.

Furthermore, a control method according to the invention allows improving the safety of both products and operators.

The invention is susceptible to numerous modifications and variations, all falling within the appended claims. Moreover, all the details and phases may be replaced by other technically equivalent elements, and the materials may be different depending on needs, without departing from the scope of protection of the invention defined by the appended claims.

The invention claimed is:

1. A control method for a stair climber comprising:
a support frame;
a motorized mechanical group configured to move the stair climber, the mechanical group being stably coupled to the support frame;
a stabilizing element operatively coupled to the support frame;
a first sensor operatively coupled to the support frame and arranged so as to detect a presence of steps during a descent process;
a processing and control logic unit operatively connected with the sensor, the stabilizing element, and to the mechanical group,
the control method comprising:
controlling the descent process with at least the following phases:
a first descent phase, in which the processing and control logic unit commands the mechanical group to cause the stair climber to advance until the first sensor detects a presence of a first step;
a second descent phase, in which the processing and control logic unit stops the mechanical group, thereby interrupting an advancement of the stair climber;
a third descent phase, in which the processing and control logic unit commands an extraction of the stabilizing element so as to arrange the stabilizing element according to an operating configuration in which a weight of the stair climber is at least partially supported by the stabilizing element;
a fourth descent phase, in which the processing and control logic unit commands the mechanical group to cause the stair climber to advance until the first sensor (11) detects the presence of a second step;
a fifth descent phase, in which the processing and control logic unit commands a retraction of the stabilizing element so as to arrange the stabilizing element according to a rest configuration in which the weight of the stair climber is supported by the mechanical group; and
a sixth descent phase, in which the processing and control logic unit commands the mechanical group to cause the stair climber to advance along a descent.

2. The control method according to claim 1, wherein in the fourth descent phase the at least one processing and control logic unit imposes a predetermined advancement speed limit on the mechanical group of the stair climber.

3. The control method according to claim 2, wherein in the sixth descent phase the processing and control logic unit eliminates the predetermined advancement speed limit from the mechanical group of the stair climber.

4. The control method according to claim 1, wherein the first sensor comprises a proximity sensor.

5. The control method according to claim 1, wherein, between the second descent phase and third descent phase, a descent start phase is operatively interposed, in which:
the processing and control logic unit sends a signal of an occurred detection of a first step to a user interface operatively connected to the processing and control logic unit;
and an operator of the stair climber accepts a first step detection message and, with the user interface, commands the processing and control logic unit to proceed with the third descent phase.

6. The control method according to claim 1, further comprising a load repositioning process, the stair climber further comprising:

a loading plane operatively coupled to the support frame and movable with respect to the support frame, the loading plane being configured to receive at least one product restingly;

an actuator operatively coupled to the loading plane and configured to move the loading plane, the actuator being operatively connected to the processing and control logic unit;

a second sensor operatively connected to the loading plane and configured to detect physical characteristics of at least the product arranged on the loading plane, the second sensor being operatively connected to the processing and control logic unit;

the load repositioning process comprising:

detecting, with the second sensor, physical characteristics of the at least one product arranged on the loading plane;

analyzing with the processing and control logic unit the detected physical characteristics of the at least one product; and commanding, with the processing and control logic unit, the actuator so that the actuator adjusts an inclination of the loading plane with respect to the support frame based on the detected physical characteristics of the at least one product.

7. The control method according to claim 6, wherein the physical characteristics of the at least one product arranged on the loading plane comprise one or both of weight or center of mass.

8. The control method according to claim 6, wherein the second sensor comprises an accelerometer.

9. The control method according to claim 6, wherein the second sensor is configured to detect variations in current in the actuator resulting from an arrangement of the at least one product on the loading plane.

10. The control method according to claim 6, wherein the stair climber comprises a memory unit operatively connected to the processing and control logic unit, the memory unit having a database comprising several predetermined inclinations based on the physical characteristics of the at least one product.

* * * * *